United States Patent

[11] 3,576,447

[72] Inventor Vernon G. McKenny
Garland, Tex.

[21] Appl. No. 791,040
[22] Filed Jan. 14, 1969
[45] Patented Apr. 27, 1971
[73] Assignee Philco-Ford Corporation
Philadelphia, Pa.

[54] DYNAMIC SHIFT REGISTER
10 Claims, 4 Drawing Figs.

[52] U.S. Cl. ........ 307/221C, 307/208, 307/238, 307/279
[51] Int. Cl. ........ G11c 19/00
[50] Field of Search ........ 307/221, 251, 205, 279, 304, 208, 238

[56] References Cited
UNITED STATES PATENTS

| | | | |
|---|---|---|---|
| 3,252,009 | 5/1966 | Weimer | 307/251X |
| 3,395,292 | 7/1968 | Bogert | 307/221 |
| 3,431,433 | 3/1969 | Ball et al. | 307/221 |
| 3,483,400 | 12/1969 | Washizuka et al. | 307/221X |

OTHER REFERENCES
ELECTRONIC DESIGN NEWS June 10, 1968 pp. 50— 55 " Multiphase Clocking" by Boysel et al. (copy enclosed)

*Primary Examiner*—John S. Heyman
*Attorney*—Herbert Epstein

ABSTRACT: A dynamic shift register comprising a plurality of cascaded stages, each stage including eight insulated gate field effect transistors and four capacitors and each stage being driven by first and second out-of-phase clock pulse sources. When the register is clocked in its ready state, the transistors of each stage allow a first capacitor (C14) to store a charge in response to each pulse from the first clock pulse source (P1) and a second capacitor (C12) to store a charge in response to each pulse from the second clock pulse source (P2). During operation, input information is supplied to the input of the first stage, and simultaneously a pulse from the first clock pulse source (P1) is supplied to each stage. If the input information is a binary ZERO, the transistors of each stage will allow a third capacitor (C13) to receive and store part of the charge on the second capacitor (C12). If the input information is a ONE, the transistors will allow the second capacitor (C12) to discharge, and the transistors also will allow the third capacitor (C13) to discharge if any charge is present on the third capacitor. Thereafter in response to the next pulse from the second pulse (P2), the transistors will allow the charge stored by the first capacitor (C14) to dissipate if a charge has been stored by the third capacitor (C13) (due to a previous ZERO input), whereby the stage will not supply any output voltage (representing a shift of the ZERO to the stage's output). If no charge has been stored by the third capacitor (C13) (due to a previous ONE input), in response to the next pulse from the second source (P2) the transistors will transfer the charge on the first capacitor (C14) to the fourth capacitor of the next stage (C21).

DYNAMIC SHIFT REGISTER

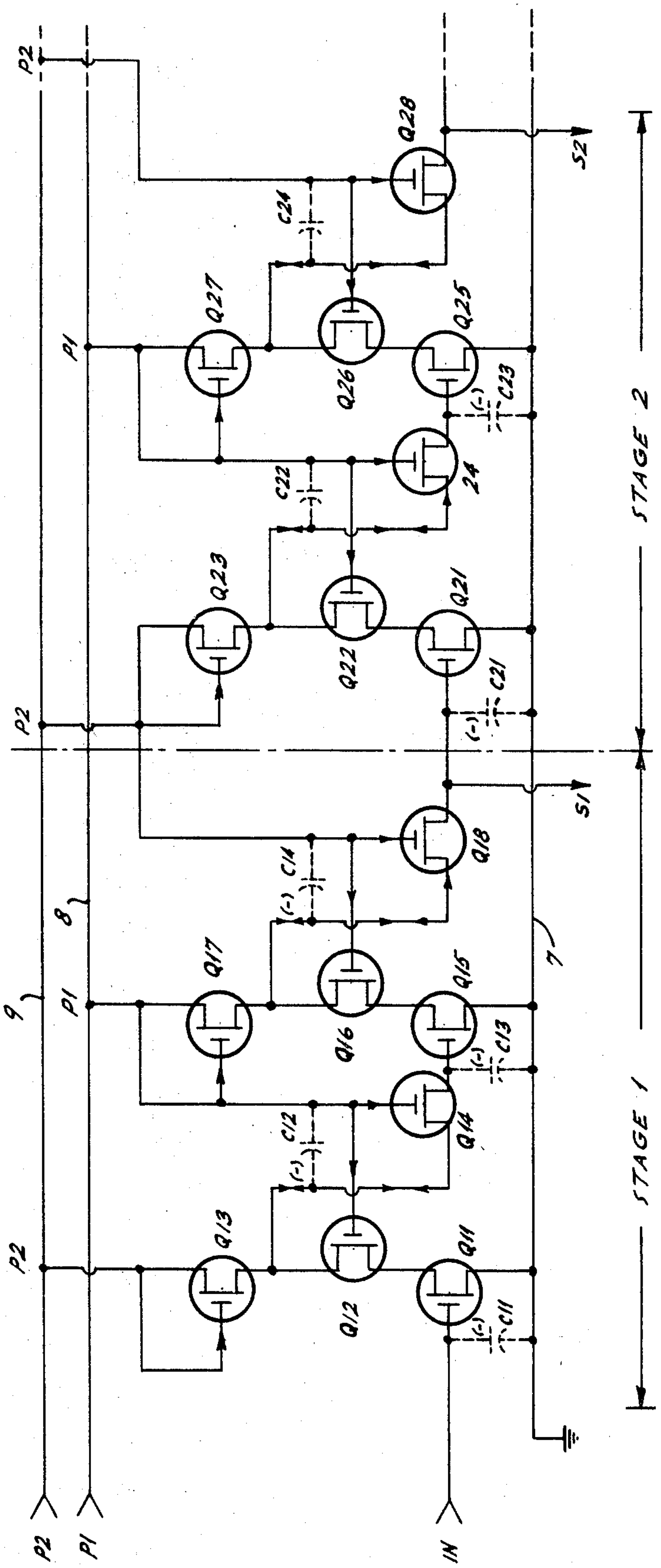
FIG. 1. DYNAMIC SHIFT REGISTER
INVENTOR.
VERNON G. McKENNY
D R Pressman
ATTORNEY

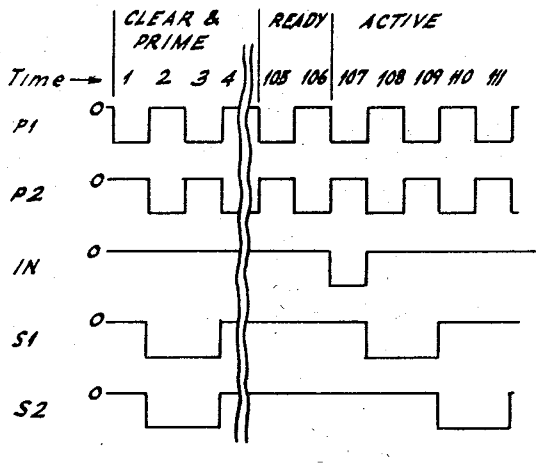

FIG. 2. WAVEFORM DIAGRAM

| | CLEAR & PRIME | | | | READY | | ACTIVE | | | | | |
|---|---|---|---|---|---|---|---|---|---|---|---|---|
| Time → | 1 | 2 | 3 | 4 | 105 | 106 | 107 | 108 | 109 | 110 | 111 | T |
| | | | | | | | | | | | | |
| IN | 0 | 0 | 0 | 0 | 0 | 0 | 1 | 0 | 0 | 0 | 0 | |
| P1 | 1 | 0 | 1 | 0 | 1 | 0 | 1 | 0 | 1 | 0 | 1 | |
| P2 | 0 | 1 | 0 | 1 | 0 | 1 | 0 | 1 | 0 | 1 | 0 | |
| | | | | | | | | | | | | |
| C11 | N | N | N | N | N | N | C | N | N | N | N | |
| Q11 | N | N | N | N | N | N | C | N | N | N | N | |
| Q12 | C | N | C | N | C | N | C | N | C | N | C | |
| Q13 | N | C | N | C | N | C | N | C | N | C | N | |
| C12 | N | C | N | C | C | C | N | C | N | C | C | |
| Q14 | C | N | C | N | C | N | C | N | C | N | C | |
| C13 | N | N | C | C | C | C | N | N | C | C | C | |
| Q15 | N | N | C | C | C | C | N | N | C | C | C | |
| Q16 | N | C | N | C | N | C | N | C | N | C | N | |
| Q17 | C | N | C | N | C | N | C | N | C | N | C | |
| C14 | C | N | C | N | C | N | C | N | C | N | C | |
| Q18 | N | C | N | C | N | C | N | C | N | C | N | |
| C21 | N | C | C | N | N | N | N | C | C | N | N | |
| S1 | N | C | C | N | N | N | N | C | C | N | N | |
| Q23 | N | C | C | N | N | N | N | C | C | N | N | |

LEGEND

C-(CAPACITORS)-CHARGED OR CHARGING
C-(TRANSISTORS)-CONDUCTING OR ENABLED

N-(CAPACITORS)-NOT CHARGED OR DISCHARGING
N-(TRANSISTORS)-NOT CONDUCTING OR NOT ENABLED

FIG. 3. COMPONENT STATE TABLE

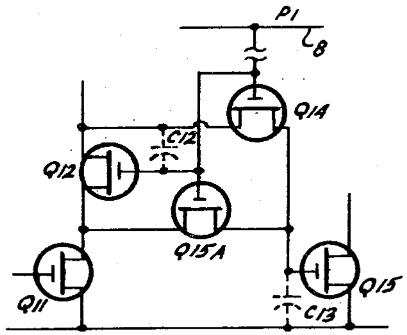

FIG. 4.

INVENTOR.
VERNON G. McKENNY

D. R. Pressman
ATTORNEY

DYNAMIC SHIFT REGISTER

This invention relates to a shift register, and more particularly a dynamic shift register or clocked delay line which may be constructed entirely of insulated gate field effect transistors in integrated circuit form.

A dynamic shift register is characterized by the fact that it is continuously clocked, whereby information at the input thereof is continuously shifted therethrough. The dynamic shift register, which also may be termed a clocked delay line, is useful for providing a precise delay of digital data. An example of a dynamic shift register using insulated gate field effect transistors is shown in U.S. Pat. No. 3,395,292 to H. Z. Bogert.

One disadvantage of prior art dynamic shift registers is the need to supply a constant direct bias current to each stage, together with shift or clock pulses. Another disadvantage is relatively high power consumption which generates undesirable heat within the components of the register. Several other drawbacks of such prior art registers are the requirement of sources of relatively high voltage clock pulses, limited operating speed, the requirement of a delay between adjacent pulses of the several clock pulse sources, and the requirement of transistors having different transconductances in each stage. In addition, many prior art dynamic shift registers require as many as four clock pulses sources. Also some prior art registers are not amenable to construction in integrated circuit form. The present invention provides a dynamic shift register which does not have any of the aforenoted disadvantages and is extremely simple in structure and reliable in operation.

Accordingly, several objects of the present invention are to provide a dynamic shift register which: (a) does not require a direct bias source, (b) has relatively low power consumption, (c) operates in response to relatively low voltage clock pulses, (d) has relatively high operating speed, (e) requires only two-phase clocking, (f) does not require that a delay be provided between adjacent pulses of the several clock pulse source, (g) can easily be constructed in integrated circuit form, and (h) requires essentially only one type of component.

DRAWING

FIG. 1 shows a schematic diagram of the dynamic shift register of the present invention.

FIG. 2 shows a diagram of voltage waveforms present in the circuit of FIG. 1.

FIG. 3 is a table which shows the states of the various components in the circuit of FIG. 1 at different times.

FIG. 4 is a fragmentary drawing which illustrates an optional additional feature of the invention.

DESCRIPTION OF CIRCUIT

The circuit of the present invention consists of a plurality of cascaded identical stages, two of which are shown in FIG. 1. As many stages as desired can be cascaded; each stage delays for a fixed period the binary information supplied to input of the first of the register. Connected to each stage is a ground bus 7 and two buses 8 and 9 which serve to supply clock pulse trains P1 and P2, typical voltage waveforms of which are shown in FIG. 2 at P1 and P2. While pulse train P2 is shown as the inverse or NOT function of pulse train P1, the negative pulses of each of the trains can be narrower than the 50 percent duty cycle pulse trains indicated, so that the P2 train may appear as a delayed version of the P1 train. While the P1 and P2 pulse trains need not have identical waveshapes, the pulses of both trains should be of the same polarity, e.g. negative as shown in FIG. 2, and the pulses of one train should not overlap with those of the other.

Each stage of the register has an input terminal and an output terminal. Each output terminal (except the last) is directly connected to the input terminal of the succeeding stage. The terminal labeled "IN" is the input terminal of stage 1 and terminal S1 is the output terminal of stage 1. Terminal S1 is directly connected to the input terminal of stage 2. The output terminal of the last stage (not shown) is connected to an output terminal of the register via an appropriate buffer stage.

Each stage consists of two identical half stages, each of which contains four insulated gate field effect transistors. Thus each stage contains a total of eight such transistors. As is well known, an insulated gate field effect transistor consists of a chip of semiconductive material of one conductivity type having two separated surface regions of the opposite conductivity type diffused therein. A conductive gate electrode overlies the channel between the regions and is insulated from the chip. Many such chips can be formed within a single wafer by use of conventional processes for making integrated circuits. Since the gate electrode is insulated from the chip, including the source and drain regions thereof, the impedance between the gate electrode and the chip is extremely high. The gate electrode forms a capacitor with the underlying substrate, consisting of the source and drain regions and the channel portion of the chip therebetween. Due to the extremely high input impedance of the gate electrode, this capacitor can store a charge for a long period of time.

Components in the first stage are designated with reference numbers in the teens (11 to 18) while components in the second stage are designated with corresponding reference numerals in the twenties (21 to 28).

The first half of stage 1 comprises three transistors, Q11, Q12, and Q13, whose source-drain circuits are connected in series between the P2 bus and ground. The second half of stage 1 comprises three transistors, Q15, Q16, and Q17, whose source-drain circuits also are connected in series between the P1 bus and ground. The first half of stage 1 also includes a fourth transistor Q14 whose source-drain circuit connects the junction of the source electrode of Q13 and the drain electrode of Q12 to the gate electrode of Q15 in the second half of stage 1. Similarly the second half of stage 1 includes a fourth transistor Q18 whose source-drain circuit connects the junction of the drain electrode of Q16 and the source electrode of Q17 to the gate electrode of Q21 of stage 2. This gate electrode of Q21 is the output terminal of stage 1 as well as the input terminal of stage 2. The gate electrodes of Q13, Q16, and Q18 are all connected to the P2 bus, while the gate electrodes of Q12, Q14, and Q17 are all connected to the P1 bus. The input terminal "IN" of the shift register and stage 1 is the gate electrode of Q11.

Certain inherent circuit and gate capacitances of the transistors of the present circuit play a vital role as temporary storage devices in the operation of the register of the present invention. Those capacitors, shown in FIG. 1 of the drawings by means of broken lines, are designated C11, C12, C13, and C14 in stage 1. Capacitors C11 and C13 represent the inherent gate-to-chip capacitances of Q11 and Q15. Capacitor Q12 represents the capacitance between the source or drain and the gate electrodes of Q12 and Q14 taken together with the metallic interconnection film which connects those gate electrodes together and to the P1 bus. This capacitor desirably is made to have a substantial value by employing a metallic interconnection film of relatively large area. Capacitor C14 represents the capacitance between the source or drain and the gate electrodes of Q16 and Q18 taken together with the metallic interconnection film which connects those gate electrodes together and to the P2 bus. C14 also is made to have a substantial value by employing an interconnection film of relatively large area. Capacitors C11, C12, C13 and C14 are sometimes hereafter referred to as the first, second, third, and fourth capacitors, respectively, of stage 1.

Each of the insulated gate field effect transistors of the circuit preferably is designed so that the width to length ratio of its channel, i.e., the portion of the transistor between its source and drain regions, is about 1.

OPERATION OF CIRCUIT

During the following discussion of the operation of the shift register, reference is made to the waveform diagram of FIG. 2 (wherein waveshapes are idealized) and the component state table of FIG. 3. Successive time intervals in FIGS. 2 and 3 are indicated by the numbers opposite the "time" legends therein. Each time interval is equal in length to one-half cycle of either clock pulse train. To facilitate explanation, the following discussion is directed in turn to three successive periods: (1) clear and prime, (2) ready, and (3) active.

During the clear and prime period, each of clock pulse trains P1 and P2 is supplied to the register for a number of cycles equal to the number of stages in the register. This will remove any random charges stored in the register and will charge the second and third capacitors of each stage. In the exemplary mode of operation discussed below, the clear and prime period is two cycles long (times $T_1$ to $T_4$) since the register illustrated in FIG. 1 comprises only two stages. However since a shift register usually will include more than two stages, the clear and prime period usually will be more than two cycles long. This is indicated in FIGS. 2 and 3 by the irregular vertical lines which separate the fourth time interval from subsequent intervals, whose numbering begins with $T_{105}$.

After the register is cleared and primed additional clock pulses often will be supplied to the register without data pulses also being supplied. Under these conditions a "ready" or idling state exists whereby the fourth capacitor of each stage will periodically charge and discharge, but no outputs will appear at any of the output terminals S1, S2, etc. Since the "ready" period is repetitive, only one cycle thereof ($T_{105}$—$T_{106}$) is discussed and illustrated.

It will be assumed for illustrative purposes that one "ready" cycle occurs and thereafter an information bit pulse representing a binary ONE is supplied to the input of the register, e.g., during $T_{107}$. This information bit will be shifted through the register during the "active" period in a synchronous manner to be described.

Two conditions relating to the operation of the register are: (1) the input information must be supplied concurrently with a P1 pulse, i.e., during a time period identified by an odd number in FIGS. 2 and 3, and (2) the outputs of the register are valid only during a P1 pulse, i.e., during said odd-numbered time periods.

Each paragraph of the following discussion of an exemplary mode of operation is headed by the appropriate numbered time interval.

CLEAR AND PRIME PERIOD ($T_1$ TO $T_4$)

$T_0$—(initial conditions)—No voltage is supplied by either of the clock buses 8 or 9 and no input voltage is supplied to the "IN" terminal of the register. If the register has been idle for a long period of time (e.g., several hours) all of its capacitors will be discharged and no voltage will exist at any point in the register. However if the register was operated more recently, random charges may be present in the capacitors of the register. Those charges are cleared or replenished, as appropriate, during the "clear and prime" period.

$T_1$—A negative pulse is supplied by bus 8, making the gate electrodes of Q12, Q14, and Q17 negative and thereby enabling those transistors to conduct. Current flows through the source-drain of Q17, charging C14 negatively in the sense indicated in FIG. 1.

$T_2$—Next a negative pulse is supplied by bus 9, making the gate electrodes of Q13, Q16, and Q18 negative. Current flows through the source-drain circuit of Q13, charging C12 negatively in the direction indicated in FIG. 1. Concurrently the charge on C14 flows through the source-drain circuit of Q18, transferring part of the charge on C14 to C21 and providing a negative voltage at the output S1. This charge transfer is aided by the fact that the left-hand terminal of C14 becomes more negative due to capacitive coupling through C14 from the negative pulse on bus 9. Although the output of S1 now is negative, which might be indicative of a binary ONE, this output may be disregarded as not valid since the register is in its clear and prime period.

$T_3$—A negative pulse again is supplied by bus 8, making the gate electrodes of Q12, Q14, and Q17 negative. The charge stored by C12 is transferred to C13 via the source-drain circuit of Q14. This transfer biases the upper electrode of C13 negatively with respect to its lower electrode, as indicated in FIG. 1. Since the negative upper electrode of C13 is connected to the gate electrode of Q15, Q15 becomes enabled. In addition, current flows from bus 8 through the source-drain circuit of Q17 to replenish the portion of the charge which C14 transferred to C21 during $T_2$. Output terminal S1 remains negative.

$T_4$—A negative pulse again is supplied by bus 9, making the gate electrodes of Q13, Q16, and Q18 negative. As a result current flows from bus 9 through Q13 to replenish the charge which C12 transferred to C13 during $T_3$. In addition the charge on C14 is drained to ground through the series-connected source-drain circuits of Q16 and Q15. Also the charge on C21 is drained to ground through the series-connected source-drain circuits of Q18, Q16, and Q15, so that potential of the output terminal S1 returns to ground potential or its normal ZERO condition.

As discussed above, the clear and prime period has twice as many time intervals (the same number of cycles) as the number of stages in the register. Thus if the register comprises, for example, 100 stages, the clear and prime period would be 200 time intervals long. At the end of the clear and prime period, the second and third capacitors of each stage (i.e., C12, C13, C22, and C23) are charged, the first and fourth capacitors of every stage (i.e., C11, C14, C21, and C24) are discharged, and the register is primed for operation.

READY period ($T_{105}$—$T_{106}$)

$T_{105}$—A negative pulse is supplied by bus 8, making the gate electrodes of Q12, Q14, and Q17 negative. Capacitor C14 charges during this interval by way of the source-drain circuit of Q17. Capacitor C21 remains discharged.

$T_{106}$—A negative pulse is supplied by bus 9, making the gate electrodes of Q13, Q16, and Q18 negative. Since Q15 and Q16 have negative voltages applied to their gate electrodes by charged capacitor C13 and by the negative pulse on bus 9, they are enabled, so that C14 discharges through Q16 and Q15. During $T_{106}$ a transient negative voltage will appear at S1 due to the charge on C14 being conducted through enabled Q18, but this transient voltage will terminate before the end of $T_{106}$ and will have no effect upon stage 2.

It will now be apparent that during the ready period, C14, as well as the corresponding capacitor of every other stage, e.g. C24, is charged during each odd-numbered time period (when train P1 supplies a pulse) and discharged during each even-numbered time period (when train P2 supplies a pulse).

ACTIVE PERIOD ($T_{107}$ AND FOLLOWING)

$T_{107}$—A ONE input, represented in FIG. 2 on waveform "IN" by a negative pulse, is supplied to the gate electrode of Q11, charging C11 and enabling Q11. Bus 8 concurrently supplies a negative pulse, enabling Q12, Q14, and Q17. Since Q11 and Q12 are both enabled, the charge on capacitor C12 will be drained to ground through the series-connected source-drain circuits of Q11 and Q12, while the charge on C13 will be drained to ground through the series-connected source-drain circuits of Q11, Q12, and Q14. After the charge has been drained from C13, Q15 becomes disabled. Capacitor C14 is charged through Q17 according to the polarity shown in FIG. 1.

$T_{108}$—The potential at "IN" (FIG. 1) returns to ground, turning off Q11. Bus 9 supplies a negative pulse, enabling Q13, Q16, and Q18. Capacitor C12 then recharges through Q13 in the polarity shown in FIG. 1. Concurrently part of the charge on C14 is transferred to C21 via Q18 so that a negative output voltage will appear at terminal S1. This output voltage is not the true delayed version of the input ONE since, as stated above, the output terminal voltages represent input voltages only when bus 8 simultaneously supplies a negative pulse from the P1 train, i.e., during the odd-numbered time intervals.

$T_{109}$—Bus 8 supplies a negative pulse, enabling Q12, Q14, and Q17. As a result part of the charge on C12 is transferred to C13 via Q14, and C14 is recharged via Q17. The output at S1, which is now valid, remains negative, representing the binary ONE input pulse supplied to "IN" during $T_{107}$, delayed by 1-bit time.

$T_{110}$—Bus 9 supplies a negative pulse, enabling Q13, Q16, and Q18. The charge on C12, which was partially transferred to C13, is replenished via Q13 so that C12 again becomes fully charged. The charges on C14 and C21 are drained to ground via Q15, Q16, and Q18, thereby terminating the output at S1. However, an output will appear at S2 during this period because of the operation of stage 2. This operation is identical to that of stage 1 except that it is delayed by two time periods. The output at S2 will not be valid, however, until $T_{111}$, the next odd-numbered time interval.

GENERAL DISCUSSION

From the foregoing description it can be seen that the shift register of the invention does not require any direct bias source. In lieu thereof only two out-of-phase driving clock pulse sources are required. It is not necessary that any delay be provided between adjacent clock pulses in the separate trains. The register can operate at speeds up to 20 megahertz although its speed is currently limited to 10 megahertz because of limitations of presently available output stages. It requires relatively low clock pulse amplitudes, e.g., from about −15 volts to about −20 volts. The register can easily be constructed in integrated circuit form since in essence it requires only insulated gate field effect transistors and connections therebetween. The capacitors used can be the inherent gate and wiring capacitances of the circuit. The device has very low power consumption; the power consumed is on the order of 55 microwatts per megahertz of pulse repetition frequency.

It should be understood that a reference to "a capacitor" in the subsequent claims can refer either to an external capacitor or to a capacitor provided by the inherent wiring or gate capacitances of the circuit, or to a combination of external capacitors and inherent circuit capacitances.

FIG. 4—ADDITIONAL FEATURE

Optionally, the speed of register can be improved even further by connecting two additional insulated gate field effect transistors to each stage. FIG. 4 shows how one such additional transistor, Q15A, would be connected from the first half to the second half of stage 1. The source electrode of additional transistor Q15A is connected to the gate electrode of Q15, the drain electrode of Q15A is connected to the drain electrode of Q11, and the gate electrode of Q15A is connected to bus 8 and the gate electrode of Q14. Because of these connections additional transistor Q15A will conduct from source to drain during the odd-numbered time periods when the pulses of the P1 pulse train are negative. This connection will enable C13 to discharge to ground through the series-connected source-drain circuits of Q15A and Q11, without first waiting for C12 to discharge through source-drain circuits of Q12 and Q11. In fact it is no longer necessary for C12 to discharge at all when Q15A is included.

The connection of a second additional transistor similar to Q15A from the second half of each stage to the first half of each succeeding stage would be made, using stages 1 and 2 as illustrative, by connecting the gate electrode of the second additional transistor to the gate of Q18 and the P2 bus, the source electrode thereof to the gate of Q21, and the drain electrode thereof to the drain electrode of Q15.

The use of two additional transistors such as Q15A in each stage is a refinement which is not essential to the basic invention.

I claim:

1. A dynamic shift register, comprising:

a. a first source of clock pulses, b. a second source arranged to supply clock pulses the phase of which is different from that of the clock pulses supplied by said first source, c. a plurality of cascaded stages, each stage being connected to both of said sources, each stage including an input terminal and an output terminal and also including:

1. first means for storing a charge in response to a pulse from said first source,
2. second means for storing a charge in response to a pulse from said second source,
3. third means for (a) conducting and storing part of the charge stored by said second means in response to a pulse from said first source, and (b) discharging the charge stored by said second and third means in response to a pulse from said first source and the energization of the input terminal of said stage,
4. fourth means for discharging the charge stored by said first means in response to a pulse from said second source and the presence of a charge stored by said third means, and
5. fifth means responsive to a pulse from said second source for providing a conductive path to said output terminal for the charge stored by said first means.

2. The register of claim 1 wherein said first and second means each comprise a capacitor and an insulated gate field effect transistor whose source-drain is connected between one of said sources and said capacitor.

3. The register of claim 1 wherein said third means comprises three insulated gate field effect transistors and a capacitor, the source-drain circuit of a first of said transistors being connected between said second means and one terminal of said capacitor, the source-drain circuits of the second and third of said transistors being connected in series between said second means and a terminal common to both of said sources, the gate electrode of the second of said transistors being connected to said second means.

4. The register of claim 1 wherein said fifth means comprises an insulated gate field effect transistor whose source-drain circuit is connected between said first means and said output terminal and whose gate electrode is connected to said second source.

5. The register of claim 1 wherein:

a. said first means comprises a first capacitor and a first insulated gate field effect transistor whose source-drain circuit is connected between said second source and one terminal of said first capacitor, b. said second means comprises a second capacitor and a second insulated gate field effect transistor whose source-drain circuit is connected between said second source and one terminal of said second capacitor, c. said third means comprises third, fourth, and fifth insulated gate field effect transistors and a third capacitor, the source-drain circuit of said third transistor being connected between said one terminal of said second capacitor and one terminal of said third capacitor, the source-drain circuits of said fourth and fifth transistors being connected in series between said one terminal of said second capacitor and a point common to both of said sources, d. said fourth means comprises sixth and seventh insulated gate field transistors, the source-drain circuits of said sixth and seventh transistors being connected in series between said one terminal of said first capacitor and said point common to both of said sources, e. said fifth means comprises an eighth insulated gate field effect transistor whose source-drain circuit is connected between said one terminal of said first capacitor and said output terminal.

6. A dynamic shift register, comprising:

a. a plurality of cascaded stages, each stage including first and second half stages, each stage having an input terminal, and output terminal, and a reference potential terminal, b. means for supplying information encoded in pulse form to the input terminal of a first of said stages and for supplying first and second mutually out-of-phase trains of clock pulses to each of said stages, c. each half stage including first, second, third, and fourth insulated gate field effect transistors, the source-drain circuits of said first, second, and third transistors of the first half of each stage being connected in series between said reference terminal and a supply point for said second clock pulse train, the source-drain circuits of said first, second, and third transistors of the second half of each stage being connected in series between said reference terminal and a supply point for said first clock pulse train, the source-drain circuit of the fourth transistor of the first half of each stage being connected between the source electrode of the third transistor of said first half of each stage and the gate electrode of the first transistor of said second half of each stage, the source-drain circuit of the fourth transistor of the second half of each stage being connected between the source electrode of the third transistor of the second half of each stage and the output terminal of each stage, d. means for supplying said first clock pulse train to the gate electrodes of the second and fourth transistors of the first half of each stage and to the gate electrode of the third transistor of the second half of each stage, e. means for supplying said second clock pulse train to the gate electrodes of the second and fourth transistors of the second half of each stage and to the gate electrode of the third transistor of the first half of each stage, and f. means providing a capacitance between the gate electrode of the first transistor of each half of each stage and said common potential point, and g. means providing a capacitance between the source electrode of the third transistor of each half of each stage and another terminal of each stage.

7. The register of claim 6 wherein said means of clause (f) is the gate electrode capacitance of the first transistor of each half of each stage.

8. The register of claim 6 wherein said other terminal of said means of clause (g) comprises an interconnection between said source electrode of the third transistor and an electrode of the fourth transistor of each half of each stage.

9. The register of claim 6 wherein said other terminal of clause (g) is a common connection point for the gate electrodes of the second and fourth transistors of the first half of each stage and the gate electrode of the third transistor of the second half of each stage, said means of clause (f) is the gate electrode capacitance of the first transistor of each half of each stage, and one electrode of said means of clause (g) comprises an interconnection between said source electrode of the third transistor and an electrode of the fourth transistor of each half of each stage.

10. The register of claim 6, each stage further including (1) a first additional insulated gate field effect transistor, the source-drain circuit of which is connected between the drain electrode of said first transistor of said first half of each stage and said gate electrode of said first transistor of said second half of each stage, the gate electrode of which is connected to said supply point for said first clock pulse train, and (2) a second additional insulated gate field effect transistor, the source-drain circuit of which is connected between the drain electrode of said first transistor of said second half of each stage and the gate electrode of the first transistor of said first half of each succeeding stage, the gate electrode of which is connected to said supply point for said second clock pulse train, whereby the operating speed of said register may be increased.